（12) United States Patent
Chen

(10) Patent No.: US 6,283,292 B1
(45) Date of Patent: Sep. 4, 2001

(54) TOOLBOX

(76) Inventor: Kun-Chen Chen, No. 6, Lane 609, Chung-Shan Rd., Sec. 1, Ye-Her Li Tachia Chen, Taichung Hsien (TW)

( * ) Notice: Subject to any disclaimer, the term of this patent is extended or adjusted under 35 U.S.C. 154(b) by 0 days.

(21) Appl. No.: 09/572,336

(22) Filed: May 18, 2000

(51) Int. Cl.[7] .................................................. B65D 85/00
(52) U.S. Cl. .......................... 206/373; 206/349; 362/154
(58) Field of Search .................................... 206/349, 372, 206/373, 216; 362/154, 156

(56) References Cited

U.S. PATENT DOCUMENTS

| | | | |
|---|---|---|---|
| 5,221,003 | * 6/1993 | Chang | 206/216 |
| 5,533,843 | * 7/1996 | Chung | 408/241 R |
| 5,685,421 | * 11/1997 | Gilmore | 206/216 |
| 5,879,072 | * 3/1999 | Huang | 362/156 |

* cited by examiner

Primary Examiner—David T. Fidei
(74) Attorney, Agent, or Firm—Rosenberg, Klein & Lee

(57) ABSTRACT

A toolbox has a body, at least one cover pivotally connected to a pivotal edge of the body, a cap pivotally connected to the pivotal edge of the body and a light received between the body and the cap. Multiple cavities are defined on the inside of each of the body and the covers to receive desired tools. The cap and the covers can be opened relative to the body in the same direction, and the toolbox can stably stand on a horizontal body. The toolbox will not fall when a modest external force is applied to the toolbox.

2 Claims, 5 Drawing Sheets

TOOLBOX

BACKGROUND OF THE INVENTION

1. Field of the Invention

The present invention relates to a toolbox, and more particularly to a toolbox with at least one cover and a cap pivotally connected to the same edge of a tool body.

2. Description of Related Art

With reference to FIGS. 4 and 5, a conventional toolbox in accordance with the prior art comprises a body (30) and at least one cover (32) pivotally connected to the body (30). Multiple cavities (not shown) are defined in the body (30) and each cover (32), and each cavity receives a desired tool. In addition, a cap (34) is pivotally connected to the body (30). A light (36) is mounted between the body (30) and the cap (34) to provide a light source to a user working in a dark environment.

The conventional cover (32) and cap (34) are respectively connected to opposite edges of the tool body (30). Thus, the cap (34) must be opened longitudinally relative to the ground when the toolbox is standing on the ground. The cap (34) easily rotates downward relative to the body (30) due to gravity. The movement of the cap (34) will influence the operation of changing or fixing the light (36).

In addition, when the tools in the toolbox and the light (36) are used simultaneously, the cover (32) will be opened longitudinally. However, because the cover (34) is able to rotate relative to the body (30), the body (30) will easily fall over when an external force is applied to almost any part of the toolbox. This is inconvenient for a person using the toolbox and may even damage the toolbox.

To overcome these shortcomings, the present invention tends to provide an improved toolbox to mitigate or obviate the aforementioned problems.

SUMMARY OF THE INVENTION

The main objective of the invention is to provide an improved toolbox having a body, at least one cover pivotally connected to a pivotal edge of the body, a cap pivotally connected to the pivotal edge of the body and a light received between the tool body and the cap. By such arrangement, the cap can be opened in the same direction as the covers. When standing on the ground, the toolbox will be stable because it will stand on the bottom of the body and an open cover and will not fall over when a modest external force is applied to the toolbox.

Other objects, advantages and novel features of the invention will become more apparent from the following detailed description when taken in conjunction with the accompanying drawings.

DETAILED DESCRIPTION OF THE PREFERRED EMBODIMENT

Figure 1:
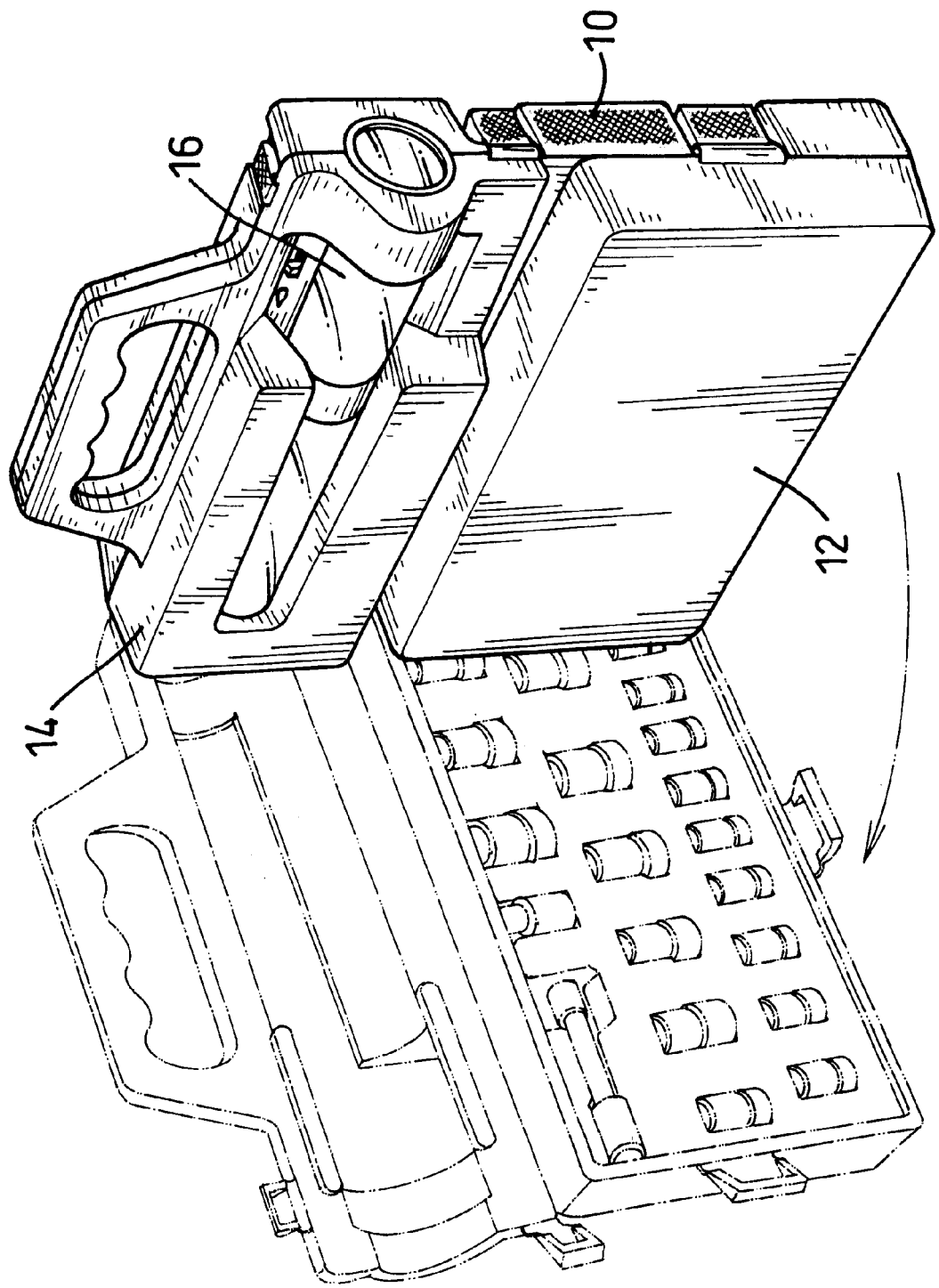
FIG. 1 is an operational perspective view of a toolbox in accordance with the present invention.

Referring to FIG. 1, a toolbox in accordance with the present invention comprises a body (10), at least one cover (12) and a cap (14) pivotally connected to the body (10) and a light (16) received between the body (10) and the cap (14). The body (10) has a one side to connect the cover (s) (12) and a side opposite to that first side. A hinged edge is formed on the side of the body (10) to which all of the covers (12) are connected simultaneously. Multiple cavities are defined in the side of the body (10) and the covers (12) facing each other. Each cavity receives a desired tool, such that the toolbox can hold multiple tools.

The cap (14) is pivotally connected to the pivotal edge of the body (10), so that the cap (14) and the covers (12) can be opened relative to the tool body (10) in the same direction, as shown by the phantom lines in FIG. 1.

Figure 2:
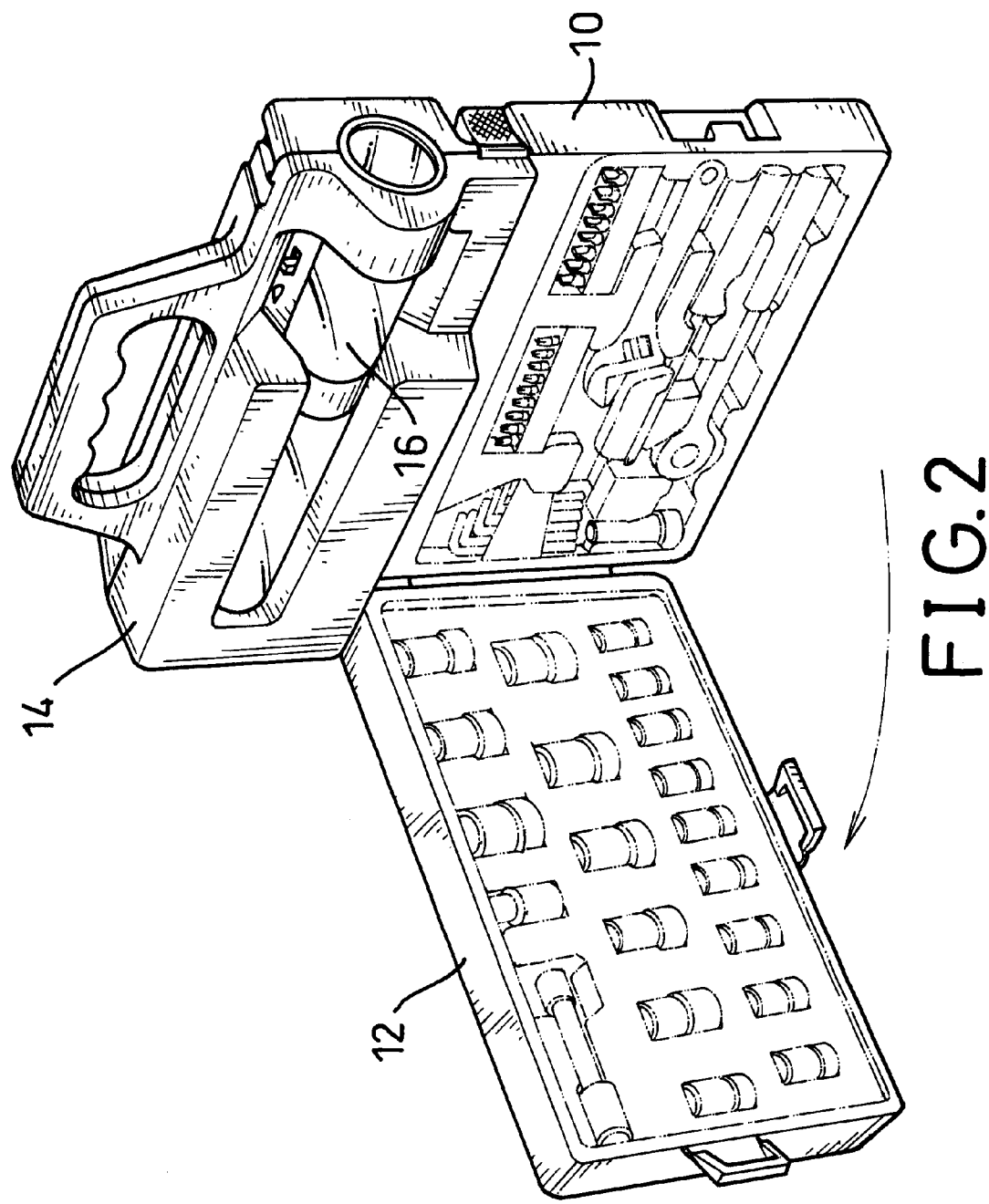
FIG. 2 is an operational perspective view of the toolbox in FIG. 1.

With reference to FIGS. 1 and 2, when the user opens the cover (12) adjacent to the bottom edge of the body (10), an enclosed area is formed between the open cover (12) and the body (10). The cover (12) and the body (10) define a stable base plane to support the toolbox on a horizontal body like the ground. The toolbox will not fall when a modest external force is applied to the toolbox. The light (16) can be stably supported above the horizontal body to provide a light source for a user working in a dark environment.

Figure 3:
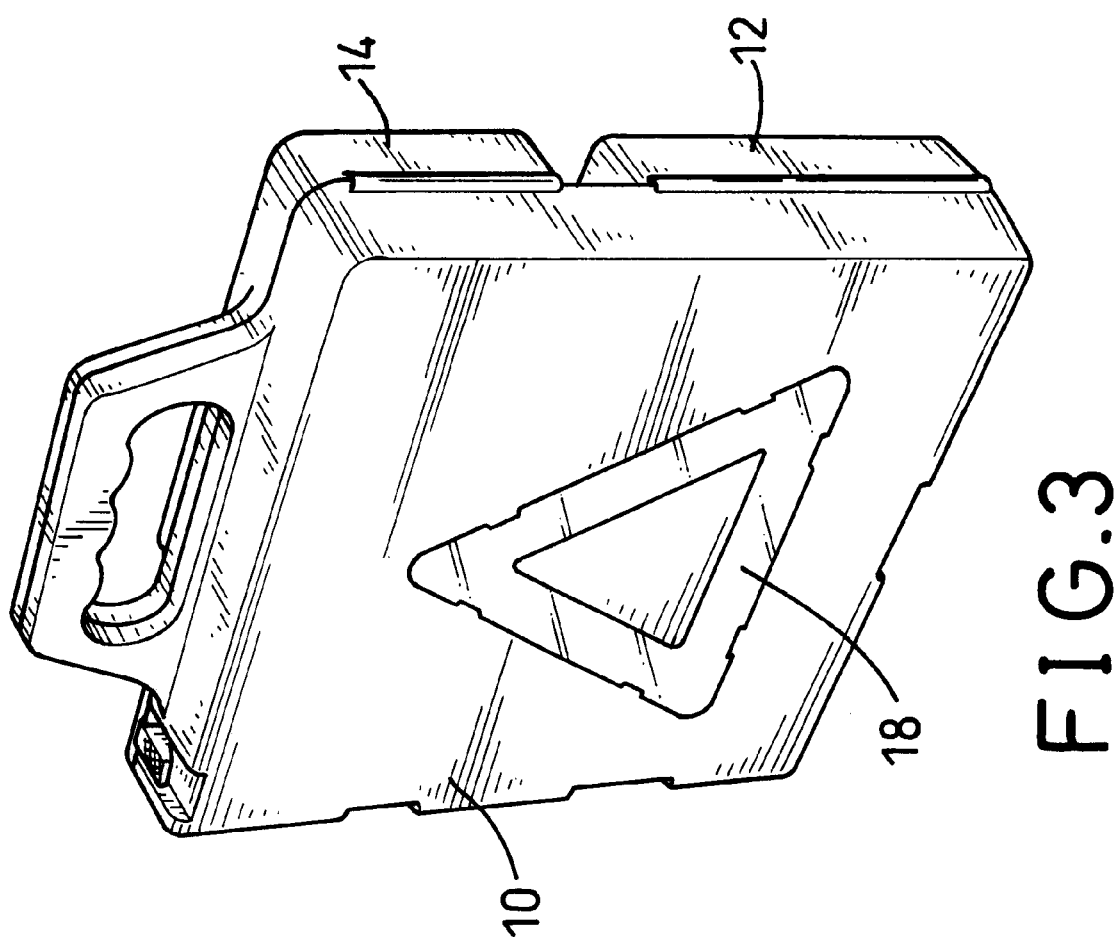
FIG. 3 is a back perspective view of the back of the toolbox in FIG. 1.
Figure 4:
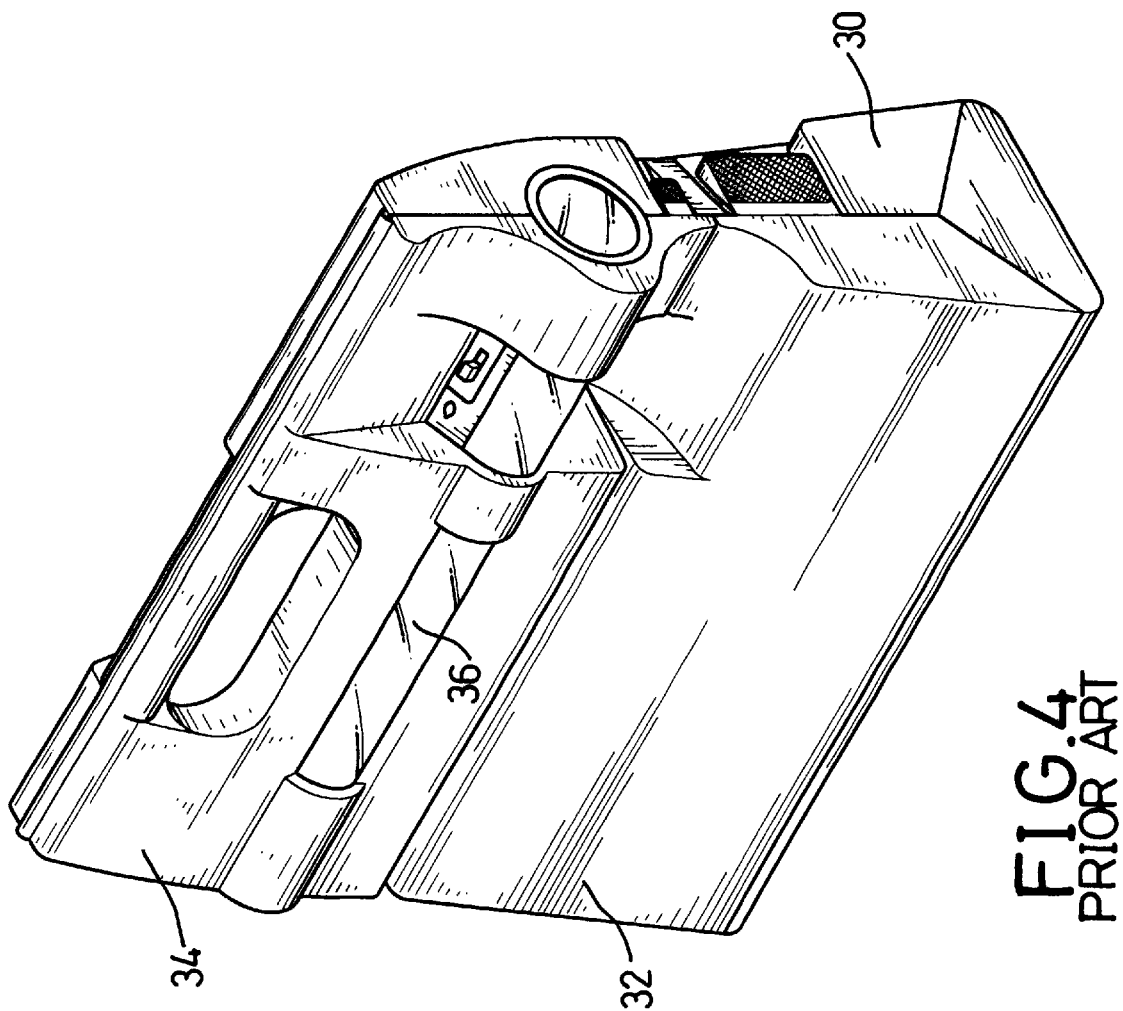
FIG. 4 is a perspective view of a conventional toolbox in accordance with the prior art.
Figure 5:
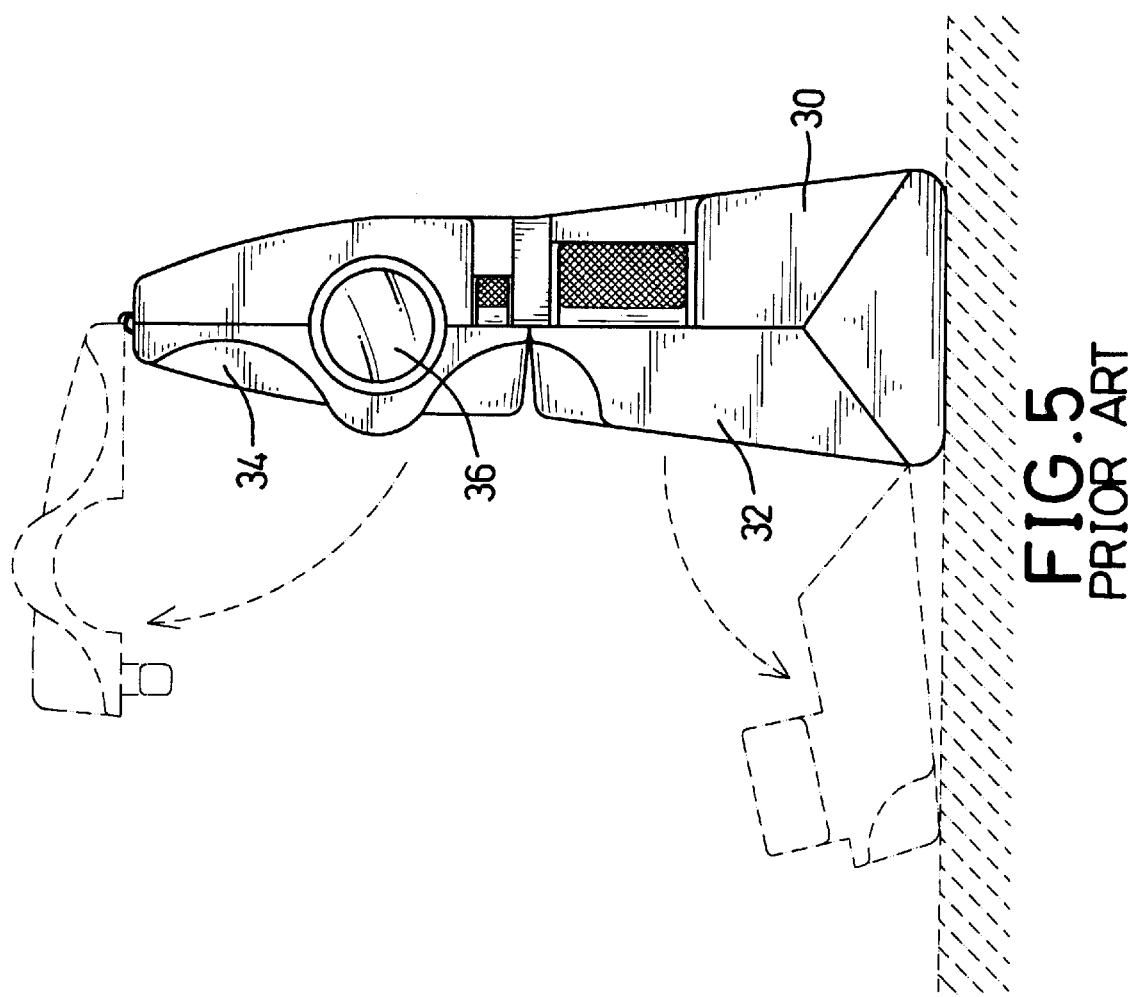
FIG. 5 is an operational side plan view of the conventional toolbox in FIG. 4.

With reference to FIG. 3, a reflective sign (18) is securely mounted on the back of the body (10), such that a warning can be provided by the reflective sign (18) in a dark environment. Consequently, the safety of using the toolbox can be improved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A toolbox comprising:

a body having a pivotal edge on one side;

multiple cavities defined on the inside of the body and each receiving a desired tool;

at least one cover pivotally connected to the pivotal edge of the body;

multiple cavities defined on the inside of each cover and each receiving a desired tool;

a cap pivotally connected to the pivotal edge of the body; and a light received between the body and the cap to provide a light source.

2. The toolbox as claimed in claim 1 further comprising a reflective sign secured on the back of the body.

* * * * *